United States Patent [19]

McKeon et al.

[11] 4,036,072
[45] July 19, 1977

[54] WELDED STEEL ROLLER CHAIN

[75] Inventors: John F. McKeon, Carmel, Ind.; Roy E. Lambert, Englewood, Fla.

[73] Assignee: FMC Corporation, San Jose, Calif.

[21] Appl. No.: 586,472

[22] Filed: June 12, 1975

[51] Int. Cl.² ............ F16G 13/02; F16G 13/06
[52] U.S. Cl. .............. 74/245 R; 74/251 R; 59/8; 59/35 CP
[58] Field of Search ........ 74/245 R, 245 C, 251 R, 74/251 C, 252, 255 R; 59/4, 35 CP, 84, 8

[56] References Cited

U.S. PATENT DOCUMENTS

| | | | |
|---|---|---|---|
| 2,159,396 | 5/1936 | Miller et al. | 74/245 R |
| 2,319,979 | 5/1943 | Collins et al. | 74/252 |
| 2,444,812 | 7/1948 | Crowley, Jr. et al. | 59/8 |
| 2,498,788 | 2/1950 | Bremer | 74/250 |
| 2,512,429 | 6/1950 | Jones | 74/251 R |
| 2,568,650 | 9/1951 | McIntosh et al. | 74/254 |
| 2,844,042 | 7/1958 | Mercier | 74/245 R |
| 2,983,158 | 5/1961 | Hodlewsky | 59/8 |
| 3,246,734 | 4/1966 | Carvallo | 198/189 |
| 3,325,991 | 6/1967 | Glendenning | 59/35 |
| 3,595,011 | 6/1971 | Nicholson | 59/8 |

*Primary Examiner*—Samuel Scott
*Assistant Examiner*—Allan R. Burke
*Attorney, Agent, or Firm*—J. W. Edwards; J. F. Verhoeven; C. E. Tripp

[57] ABSTRACT

A roller chain that includes a series of alternately arranged roller links and pin links is manufactured by welding side bars to separately formed bushings and pins. Each roller link has a pair of laterally spaced side bars extending in a direction longitudinally of the chain. A pair of bushings extend transversely of the chain between the side bars and a pair of rollers are rotatably mounted on the bushings. Welds fuse each end portion of each bushing to an adjacent side bar end portion. Each pin link has a pair of laterally spaced side bars extending in a direction longitudinally of the chain, with one side bar being located on one side of an adjacent pair of roller links and the other side bar being located on the opposite side of the roller links. A pair of pins extend transversely between the side bars, through bore openings in the bushings of each roller link. Welds fuse each end portion of each pin to an adjacent side bar end portion.

4 Claims, 4 Drawing Figures

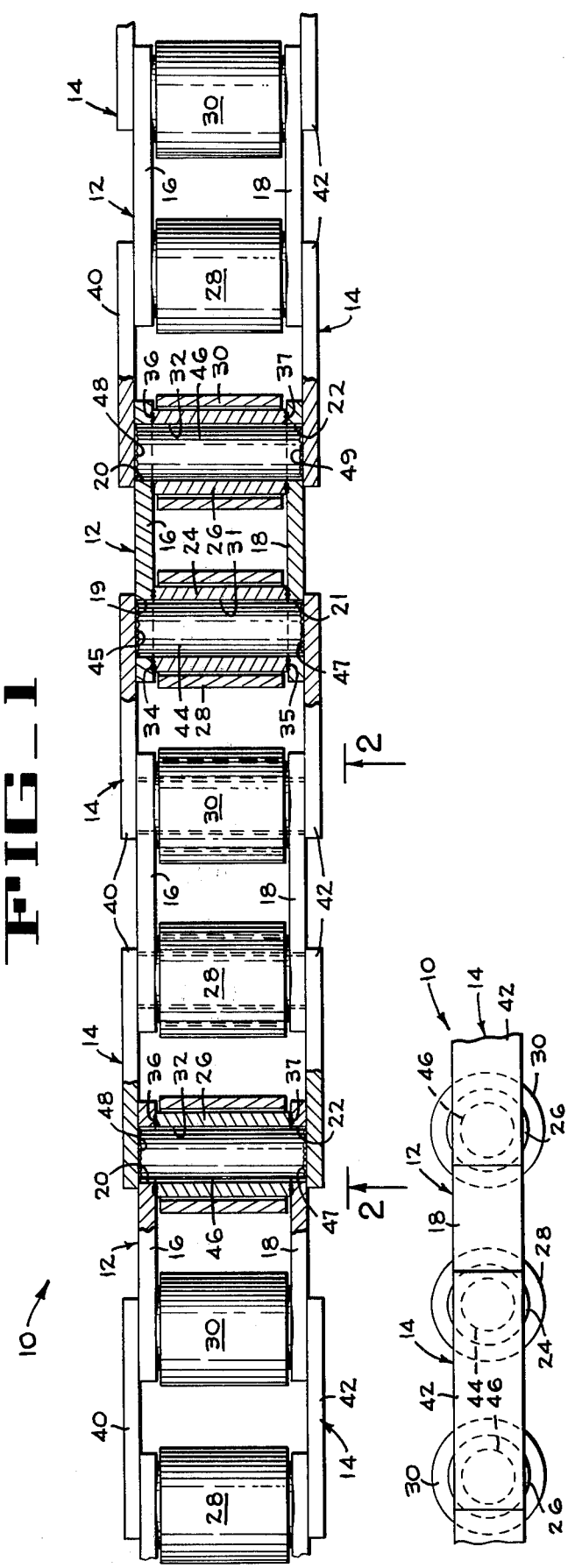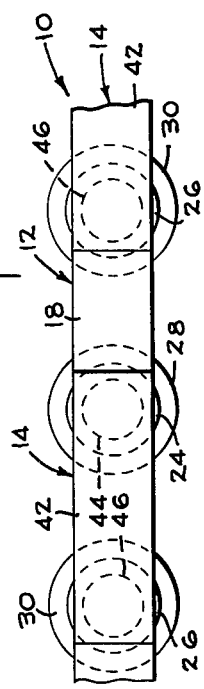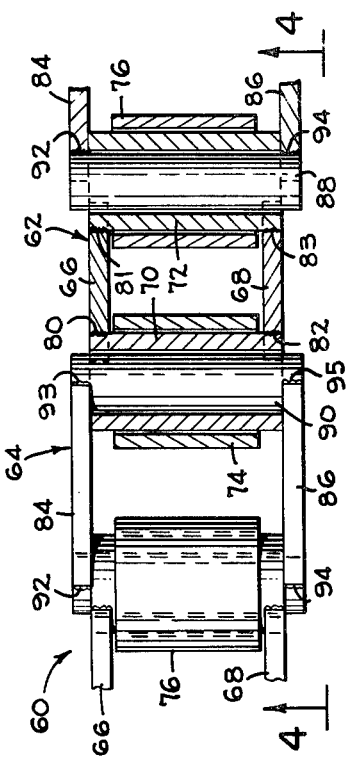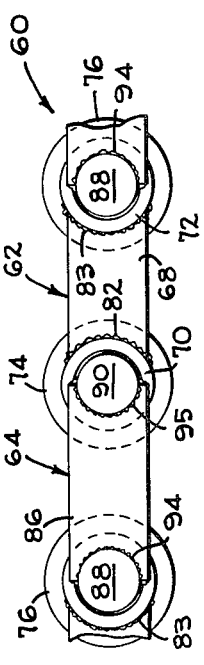

WELDED STEEL ROLLER CHAIN

BACKGROUND OF THE INVENTION

1. Field of the Invention

This invention relates to precision steel roller chains that are made to extremely close tolerances and that operate over sprockets. More specifically, the chains include roller links and pin links that are alternately arranged, and these links have laterally spaced side bars welded to each end of transversely extending bushings and pins, respectively. Rollers are mounted upon the bushings of the roller links, and these bushings have axial bores for receiving pins that connect the pin links to the roller links.

2. Description of the Prior Art

Sprocket chains of the bushing type have been constructed with two side bars and two bushings cast in one piece, to form a bushing link. Two of these bushing links are connected intermediately by two side bars in a manner that enables pivotal movement between links. Such chains are disclosed in U.S. Pat. Nos. 169,955 and 1,866,993.

In a type of sprocket chain known as a steel chain, the bushings are milled at their ends, and these ends are pressed into oblong holes punched in side bars to prevent the bushings from turning within the side bars. A bushing link, formed in that manner, has bushings that provide sufficient bearing area, on the connecting pins of pin links, to give the chain reasonable life. The connecting pins are generally milled at one end, or else provided with a lug, to prevent the pin from turning in the pin link side bars. Steel chains have also been made with bushing links, formed by separately constructed bushings that extend through side bars, to the outer sides thereof where the bushings are welded along their outer periphery to the outer surfaces of the side bars, as shown in U.S. Pat. Nos. 2,319,979 and 3,246,734. U.S. Pat. No. 2,512,429 shows a bushing with one end welded to an inner surface of a side bar and a pair of such bushings and side bars are oppositely arranged to form a bushing link.

It is desirable to reduce the weight and boundary dimension of a roller chain, while maintaining the basic ASA operating standards of roller width and pitch. Side bars, with bushings that extend through the side bar, must have a height that is dependent upon the diameter of the bushing. Pins, that project beyond the outer faces of the side bars of the pin links, determine the overall width of the roller chain, and it is one object of the present invention to provide a compact welded steel chain. Rollers, fitting about bushings, make it difficult to weld the bushings to the inner faces of the side bars, and bushings, fitting about pins, make it difficult to weld the ends of the pins to the inner faces of the side bars.

SUMMARY OF THE INVENTION

A pair of laterally spaced side bars, that extend in a direction longitudinally of a roller chain, and a pair of bushings, that extend in a direction transversely of the chain between the side bars with a sleeve-like roller being rotatably mounted upon each bushing, are fused together, at the end portions of the bushings and side bars, by welds, to form a roller link. The bushings have axial bores for receiving pins, and the side bars are welded to the bushings, in an arrangement that enables insertion of the pins into the bushing bores. In a preferred embodiment of the invention, the side bars have pin openings in alignment with the bushing bores, and the ends of the bushings are welded in abutting relationship with inner faces of the side bars. In a modified form of the invention, each side bar end is welded in abutting relationship with the curved surface at an end portion of a cylindrical bushing.

A pair of roller links, as described above, are joined together by a pin link to form a section of roller chain. The pin link is formed by a pair of laterally spaced side bars extending longitudinally of the chain, one side bar being located on one side of the pair of roller links and the other side bar being located on the opposite side of the pair of roller links, a pair of pins extending transversely of the chain, between the side bars and fitting through bushing bore openings in each roller link, and welds fusing each end of each pin to a side bar. The ends of the pins can be welded in abutting relationship with the inner faces of the side bars or the side bar ends can be welded in abutting relationship with the curved surfaces at the end portions of the cylindrical pins.

A welded precision steel roller chain, made in accordance with the present invention, maintains ASA standards for roller pitch and roller width, but this chain is lighter in weight and has reduced boundary dimensions that include overall width of chain and side bar height. By welding the bushings to the side bars, an adequate connection is made, and it is not necessary to extend the bushings through holes in the side bars. Thus, the side bar height can be reduced. Since the pins are welded to the side bars, there are no outward projections beyond the outside faces of the side bars and the overall width of the chain is reduced. Such reductions in chain component sizes reduce the weight of the chain.

BRIEF DESCRIPTION OF THE DRAWING

FIG. 1 is a plan view of a roller chain embodying the present invention, with portions of the chain being broken away to show underlying structure.

FIG. 2 is a side elevational view of a portion of the roller chain, taken on the line 2—2 of FIG. 1.

FIG. 3 is a plan view of a modified form of roller chain, with portions of the chain being broken away to show underlying structure.

FIG. 4 is a side elevational view, of the roller chain, taken on the line 4—4 of FIG. 3.

DESCRIPTION OF THE PREFERRED EMBODIMENTS

Looking now at FIG. 1, a length of roller chain 10 is shown, having alternately arranged roller links 12 and pin links 14. Each roller link has a pair of laterally spaced side bars 16 and 18 extending in a direction longitudinally of the roller chain. Openings 19 and 20 are provided in the opposite end portions of the side bar 16, and similar openings 21 and 22 are provided in the opposite end portions of the side bar 18. A pair of bushings 24 and 26 extend transversely of the roller chain between the side bars.

A roller 28 is rotatably mounted upon the bushing 24 in an encircling sleeve-like manner, and a roller 30 is rotatably mounted on the bushing 26 in an encircling sleeve-like manner. The bushing 24 has an axial bore 31 that is positioned in alignment with the openings 19 and 21 in the side bars 16 and 18, respectively. Bushing 26 has an axial bore 32 that is positioned in alignment with the openings 20 and 22 in the side bars 16 and 18, respectively. A weld 34 fuses one end of the bushing 24 to the side bar 16, and the opposite end of the bushing is fused to the side bar 18 by a weld 35. One end of the bushing 26 is fused to the side bar 16 by a weld 36, and a weld 37 fuses the opposite end of the bushing to the side bar 18.

Each pin link 14 has a side bar 40, that extends longitudinally of the roller chain 10 on one side of two adjacent roller links 12, and a similar side bar 42, that is laterally spaced from the side bar 40 and located on the opposite side of the roller links. A pin 44 extends transversely between the side bars 40 and 42. This pin fits through the axial bore 31 of the bushing 24 and through the openings 19 and 21 in the side bars 16 and 18, respectively. Extending transversely of the chain, through the axial bore 32 of the bushing 26 and through openings 20 and 22 in the side bars 16 and 18, respectively, is a pin 46. One end of the pin 44 is fused to the inside face of side bar 40 by a weld 45, and the opposite end of this pin is fused by a weld 47 to the inside face of side bar 42. The pin 46 is similarly fused at one end by a weld 48 to the side bar 40, and at the other end of this pin is fused by a weld 49 to the side bar 42.

It will be noted that the welds 34, 35, 36 and 37, fusing the ends of the bushings 24 and 26 to the side bars 16 and 18, are located in positions having minimal access thereto. Thus, it is suggested that a resistance type of welding, such as projection welding, be employed. The rollers 28 and 30, that are positioned about bushings 24 and 26, present a problem for resistance type welding because of the possibility of arcing between the bushing and the roller. By submerging the roller link 12 in oil and welding the link in such a submerged position, arcing between the bushing and roller can be prevented. Similarly, the chain 10 can be submerged in oil for welding the pin links 14, to prevent arcing between the pins 44 and 46 and the bushings.

A modified form of roller chain 60 is shown in FIG. 3, and this chain includes roller links 62 and pin links 64. Each roller link is formed by a pair of laterally spaced side bars 66 and 68, that extend longitudinally of the roller chain, and by a pair of cylindrical bushings 70 and 72, that extend transversely of the roller chain between the side bars. A roller 74 is rotatably mounted in a sleeve-like manner upon the bushing 70, and a roller 76 is similarly mounted upon the bushing 72. A weld 80 fuses one end of the side bar 66 to a curved surface at the end portion of the cylindrical bushing 70, and a weld 81 fuses an opposite end of the side bar to a curved surface at the end portion of the bushing 72. Similarly, a weld 82 fuses one end of the side bar 68 to a curved surface at the end portion of the bushing 70, and the opposite end of the side bar is fused to the bushing 72 by a weld 83. The roller links are alternately arranged with the pin links to form the roller chain.

Each pin link 64 includes a pair of laterally spaced side bars 84 and 86, that extend in a direction longitudinally of the roller chain 60, and a pair of cylindrical pins 88 and 90, that extend transversely of the chain between the side bars. The pin 88 extends through an axial bore of the bushing 72, and the pin 90 extends through an axial bore of the bushing 70. A weld 92 fuses one end of the side bar 84 to a curved surface at the end portion of the cylindrical pin 88, and a weld 93 fuses the opposite end of the side bar to a curved surface at the end portion of the cylindrical pin 90. Similarly, a weld 94 fuses one end of the side bar 86 to the curved surface at the other end portion of the pin 88, and a weld 95 fuses the opposite end of the side bar to the curved surface at the other end portion of the pin 90.

The welds 80, 81, 82 and 83 that connect the ends of the side bars with the curved surfaces at the end portions of the cylindrical bushings 70 and 72 can be made by a resistance type of welding such as projection welding. Similarly, the welds 92, 93, 94 and 95 connecting the side bars 84 and 86 to the pins 88 and 90 can be made by a resistance type of welding. When forming a roller link 62, the ends of the bushings 70 and 72 and the side surfaces of the side bars 66 and 68 are exposed, so that another type of welding, such as penetration welding, could be employed. Similarly, welds 92, 93, and 94 and 95, which connect the ends of the side bars 84 and 86 to the curved surfaces at the end portions of cylindrical pins 88 and 90, could be made by a penetration type of welding since the side surfaces of these joints are exposed.

Although the best mode contemplated for carrying out the present invention has been herein shown and described, it will be apparent that modification and variation may be made without departing from what is regarded to be the subject matter of the invention.

What is claimed is:

1. In a roller chain having alternately interconnected roller links and pin links, said roller links being provided with axially bored bushings extending between roller link side bars, each said pin link having a pair of laterally spaced imperforate side bars extending longitudinally of the chain on opposite sides, said side bars having inside and outside faces, with said inside faces lying adjacent the ends of said roller link side bars, a pair of pins extending transversely of the chain between said pin link side bars with each said pin extending through a pair of roller link side bars and a respective roller link bushing, said pins being substantially cylindrical with curved side surfaces therealong and at the end portions thereof, and welds fusing said pin link side bars to said pins at the end portions thereof, respectively, with said pin link side bars being free of welds on the outside faces thereof remote from said roller link ends.

2. The roller chain of claim 1 wherein further said roller link side bars have inside faces and said roller link bushings and include welds between the end portions of said bushings and said inside faces of said roller link side bars.

3. The roller chain of claim 2 wherein said pin link side bars have a height less than the diameter of said roller link bushings.

4. The roller chain of claim 2 wherein said welds lie entirely upon the inside faces of said roller link side bars and said pin link side bars.

* * * * *

UNITED STATES PATENT AND TRADEMARK OFFICE
CERTIFICATE OF CORRECTION

PATENT NO. : 4,036,072
DATED : July 19, 1977
INVENTOR(S) : John F. McKeon; Roy E. Lambert It is certified that error appears in the above-identified patent and that said Letters Patent are hereby corrected as shown below:

It is certified that error appears in the above-identified patent and that said Letters Patent are hereby corrected as shown below:

Claim 2, line 3, delete "and".

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*